United States Patent [19]
Vrisakis et al.

[11] 4,253,849
[45] Mar. 3, 1981

[54] GRANULATION OF SODIUM METASILICATE

[75] Inventors: Georges Vrisakis, Collonges au Mont D'Or; Jacques Chastel, Mont-Saint-Aignan, both of France

[73] Assignee: Rhone-Poulenc Industries, Paris, France

[21] Appl. No.: 946,027

[22] Filed: Sep. 26, 1978

[30] Foreign Application Priority Data

Sep. 27, 1977 [FR] France .................. 77 29001

[51] Int. Cl.$^3$ .................. B01J 2/16; C01B 33/32
[52] U.S. Cl. .................. 23/313 AS; 423/332
[58] Field of Search ....... 264/117; 23/313 R, 313 AS, 23/313 FB; 423/332–334; 156/62.2; 252/156, 174

[56] References Cited

U.S. PATENT DOCUMENTS

| | | | |
|---|---|---|---|
| 3,208,822 | 9/1965 | Baker et al. | 23/313 AS |
| 3,227,789 | 1/1966 | Tytus et al. | 264/117 |
| 3,340,018 | 9/1967 | Otrhalek | 23/313 HS |
| 3,868,227 | 2/1975 | Gericke et al. | 23/313 AS |
| 3,884,645 | 5/1975 | Kinne | 23/313 FB |

FOREIGN PATENT DOCUMENTS 592240  2/1960  Canada .
1100817  9/1955  France .

OTHER PUBLICATIONS

"The Spherodizer Granulation Process"; C.E.P.; vol. 60, No. 2; pp. 62–66; (Feb. 1973).

*Primary Examiner*—Frank Sever
*Attorney, Agent, or Firm*—Burns, Doane, Swecker & Mathis

[57] ABSTRACT

Sodium metasilicate is granulated by (i) establishing, in a first zone, a cloud of anhydrous sodium metasilicate powder; (ii) injecting into said cloud (i), and intimately contacting therewith, an atomized liquid phase which comprises a liquid formulation of a sodium silicate; (iii) said intimate contacting (ii) being conducted in an atmosphere of a drying gas, whereby crystallization of the anhydrous metasilicate and agglomeration of the thus coated particulates are effected, (iv) next subjecting the effluent cohered granules of said first zone to a state of agitation in a second discrete zone, in an atmosphere of a heating gas and whereby the agitated granules are at least partially converted to the sodium metasilicate pentahydrate; (v) and thence recovering from said second discrete zone a granular sodium metasilicate comprising from about 2 to 6% by weight water, and useful in the manufacture of a variety of detergent compositions.

20 Claims, 1 Drawing Figure

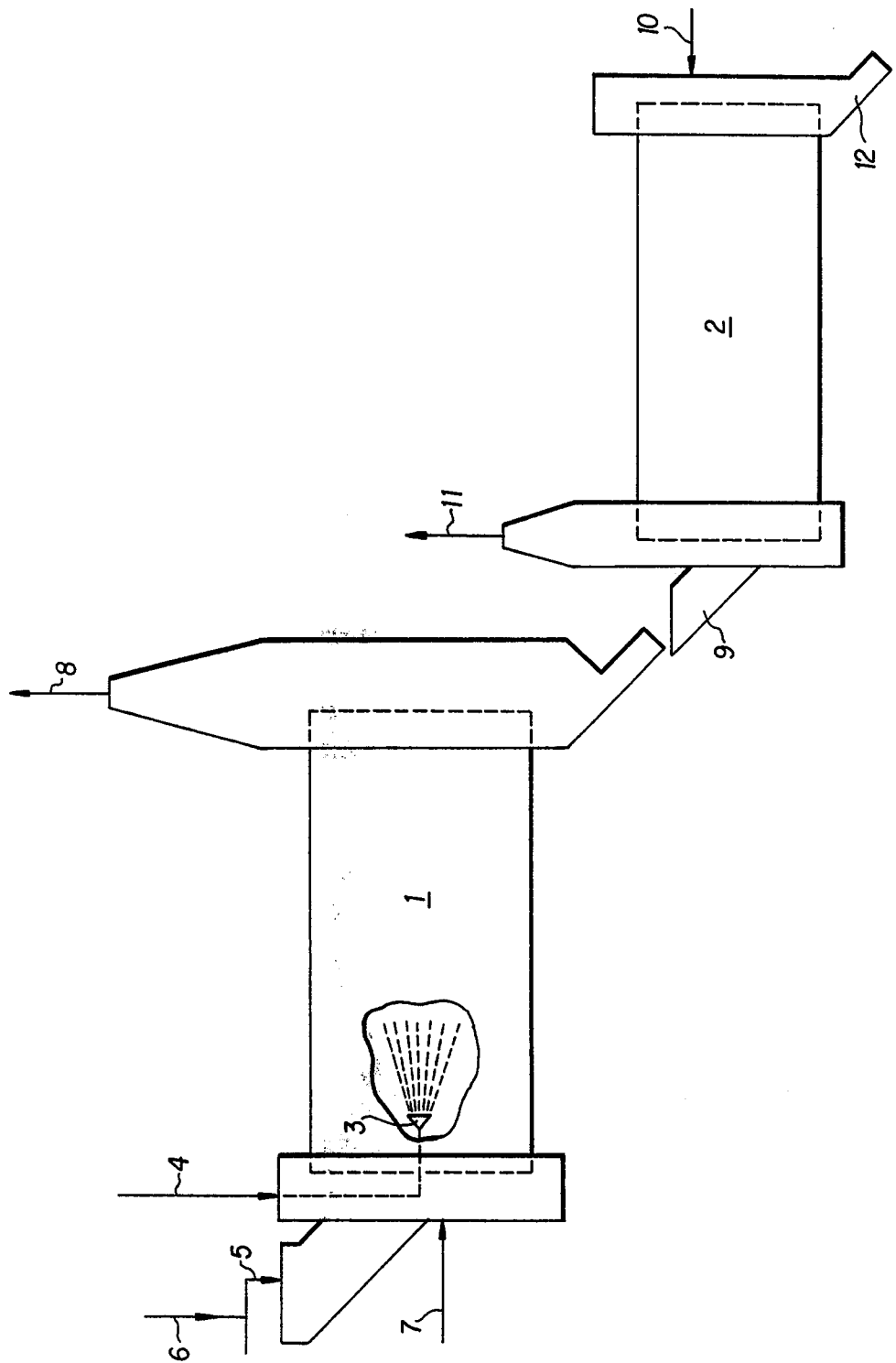

GRANULATION OF SODIUM METASILICATE

BACKGROUND OF THE INVENTION

1. Field of the Invention

The present invention relates to a process for the granulation of sodium metasilicate, and, more especially, to the preparation of sodium metasilicate having a narrow range of granulometric size distribution and good resistance to attrition or "dusting". The invention also relates to a storage-stable sodium metasilicate which is unreactive with both perfumes and non-ionic compounds, e.g., surfactants. In particular, the invention relates to anhydrous sodium metasilicate comprising 2 to 6% water in the final product, principally in the form of the sodium metasilicate pentahydrate (55 to 80% of the 2 to 6% of this water).

2. Description of the Prior Art

The problem with which this art has been faced as regards effective granulation with concomitant resistance to attrition is made difficult by two requirements, one of which demanding good abrasion resistance and the other consisting of granulating an anhydrous metasilicate powder while employing but small amounts of binders. Known responses to this dual requirement have been contradictory. In actual fact, if good resistance to attrition be desired, large amounts of binder must be used, which is difficult to reconcile with the use of large quantities of metasilicate.

Processes to prepare granules of a variety of substances which are solid at ordinary temperatures and soluble in water have long been proposed to the art. One of such processes consists of spraying droplets of a heat liquefied solution by means of suitable atomizing device, through a tower containing a drying or cooling gas. This process has been deemed pelletizing or "prilling". However, this process displays the disadvantage of difficult operation because of many technical problems; mass production requires long retention times and, thus, large scale equipment.

In French Pat. No. 1,100,817, it has been proposed to atomize a paste under pressure in a rotating furnace, in parallel currents heated by flow of hot gas, and equipped with means to advance the product, such as small blades.

And in French Pat. No. 1,351,668 [U.S. Pat. No. 3,227,789], a process for coating in the form of onion-skin-like layers is described; the operations of granulation and drying taking place virtually at the same time. According to this process, the metasilicate particles are introduced into a coating zone at a temperature in excess of 130° C. in order to establish a moving bed of crystallized particles, then a solution of anhydrous sodium metasilicate is atomized so as to effect formation of a metasilicate coating layer, which is then heated to eliminate the water. It suffices to subsequently repeat this operation as many times as are considered necessary to obtain the desired product. In these cases, a rotating furnace equipped with blades is utilized to raise the material and form a moving bed thereof, thus contributing to the operation of the process.

Cf. U.S. Pat. Nos. 3,208,822 and 3,868,227; Canadian Pat. No. 592,240; and *Chemical Engineering Process*, 69, No. 2, pp. 62–66 (1973).

SUMMARY OF THE INVENTION

It has now surprisingly been found that a metasilicate containing 2 to 6% water, by weight with respect to the final product, can conveniently be prepared by introducing, into a first zone, anhydrous metasilicate and a metasilicate liquor, next contacting the solid and liquid phases by atomizing the liquid phase and directing said atomized liquid into a powdery mass of particles constituting the solid phase, said atomization zone being exposed to the thermal action of a hot gas such as to impart to the granules formed an adequate coherence, while maintaining in said granules a water content of 1 to 8%, and thence subjecting the granules thus obtained, in a subsequent or downstream zone designated the aging zone, to a heat treatment in an agitated vessel, in order to effect at least partial conversion to the sodium metasilicate pentahydrate.

BRIEF DESCRIPTION OF THE DRAWING

The FIGURE of drawing is a schematic representation of apparatus suitable for effecting the granulation of sodium metasilicate according to the invention.

DETAILED DESCRIPTION OF THE INVENTION

More particularly according to the invention, the temperature of the hot gases at the inlet of the first zone is less than a flashing temperature such as would give rise to a flash effect, so as to permit both the wetting of the particles and concomitant formation of agglomerates.

The "flash effect" can be defined as the effect resulting from a product drying rate which is greater than its rate of wetting. However, the temperature must nonetheless be sufficient to afford good drying; it is typically comprised between 200° and 500° C. Preferably, the gases should be substantially free of carbon dioxide. The temperature of the gases at the zone outlet is typically comprised between 50° and 130° C.

The average temperature in the aging zone or zones must be lower than the crystallization temperature of sodium metasilicate pentahydrate, i.e., 72° C., but greater than the melting point of the metasilicate . 9 $H_2O$, i.e., 42° C. In actual commercial practice, this temperature must be lower than 65° C., to avoid the risk of adhesion.

The retention time in the aging zone at this temperature is preferably comprised between about 5 and 30 minutes.

The liquid phase at the inlet of the first zone, as aforenoted, consists of a metasilicate liquor obtained, for example, by dissolving anhydrous sodium metasilicate in water, or by treating a silicate with a higher $SiO_2/Na_2O$ ratio, with sodium hydroxide.

In contrast to the conventional technique as presently practiced in the state of the art, according to the invention, the liquid ratio, expressed as the anhydrous product with respect to the dry ungranulated product, may be lowered to values on the order of 20 to 25/100 in parts by weight, while maintaining good resistance to attrition.

It should be noted that in the first zone, crystallization of the anhydrous sodium metasilicate takes place, while in the second zone water of crystallization is taken up to form the sodium metasilicate hydrates, specifically the pentahydrate.

Finally, in a particularly advantageous embodiment of the invention, a portion of the product emanating from the outlet of the last aging zone is recycled to the inlet of the first zone. One of the most important effects of this recycling is to establish stable process flow.

It is known that the granulometry at the process outlet depends, among other things, on the granulometry of the feed anhydrous metasilicate. Thus, from a practical viewpoint, it is rather difficult to procure an anhydrous metasilicate of sufficiently regular granulometry.

It has now been determined that, in the process according to the invention, when a portion of the downstream product is recycled to the inlet of the first zone, this will compensate at least in part for the deviations in granulometry in the feed to the system. The downstream product is defined as the product resulting from the screening and grinding of the metasilicate issuing from the second zone(s).

Advantageously, the rate of recycling is comprised between 20 and 80. Preferably, it is on the order of 40/60, the first number reflecting the amount of product recycled by weight, the second the amount of final product by weight.

According to another embodiment of the invention, the exit temperature of the gases from the first zone is comprised between 50° and 70° C., in order to fix a larger amount of water of crystallization, i.e., on the order of 6 to 3%.

According to yet another embodiment, the metasilicate issuing from the first zone may be subjected to an additional treatment in the aging zone; specifically, by atomization therewith of a stabilizing or other additive, such as citric acid, a phosphorus derivative [as per U.S. Pat. No. 3,996,399, hereby expressly incorporated by reference], or a gluconic derivative [as per U.S. Pat. No. 4,031,024, also hereby expressly incorporated by reference].

The process of the present invention may be carried out in apparatus itself well known to the art. For example, for the first zone, any sufficiently adequate dispersing means can be employed for imparting motion or fluidization to a powdery mass, from upstream to downstream, as well as for imparting motion to said mass, or establishing therein a state of equilibrium, from top to bottom of the vessel, and in which an atomizing cloud may be formed. In actual practice, a rotating granulator drum is employed fitted with vanes to effect the formation of a curtain or shower of particles which will occupy the major interior portion of said drum, and into which the liquid phase is atomized by means of at least one injector.

According to another embodiment of the present invention, the curtain or shower of particles is essentially completely located in the upstream section of the drum comprising the first zone. An equivalent system consisting of a fluidized bed equipped with means to displace the fluid bed may also be used.

The second zone consists simply of a single agitating device, such as a rotating drum, fluidized bed, and the like.

The product produced according to the invention is characterized by the fact that it contains 2 to 6% by weight water. Further, it preferably displays an attrition resistance such that any loss by weight is less than 10%. This resistance to attrition is measured by determining the loss in weight of a sample exposed to the action of nitrogen, in a fluidized bed, for 6 hours, the flow of nitrogen being 425 liter/hour through a diaphragm of 0.4 mm in diameter.

In order to further illustrate the present invention and the advantages thereof, the following specific examples are given, it being understood that same are intended only as illustrative and in nowise limitative.

In the examples which follow, and specifically referring to the FIGURE of drawing, apparatus was utilized comprising the two rotating drums 1 and 2. Drum 1, which defines the first zone of treatment, was equipped with conventional vanes, not shown, which effected creation of a cloud of particles which were conveyed from upstream to downstream.

The drum 2 was a drum of simpler design, comprising a lesser number of vanes and rotating at a lower peripheral velocity, so as to form a "roll" of product rather than a curtain or screen.

Also in the examples which follow, the dimensions and velocity characteristics of the respective drums were:

|  | Drum 1 | Drum 2 |
|---|---|---|
| Length in Meters | 7.7 | 6 |
| Diameter in Meters | 2.3 | 2.10 |
| Velocity of Revolution (rpm) | 7 | 1 |

The liquid phase was introduced through the inlet conduit 4 and atomized in the drum 1 by means of the injector 3.

The solid phase was introduced through the inlet conduit 5, which is shown operably connected to the conduit 6, thus providing for optional recycling of the resultant product.

The hot gases necessary for operation of the process were introduced through the line 7, concurrently, and evacuated through the line 8.

The product issuing from the drum 1 was conducted by simple gravity through the conduit 9 into the drum 2 where it was countercurrently treated with air at ambient temperature, the air being introduced through line 10 and evacuated through line 11, with the final product being collected at outlet 12.

Moreover, in conducting the process according to the invention, the following operating conditions were observed:

The sodium metasilicate treated was a powdered product consisting of the refuse of a sieve 27, maximum 3% according to the AFNOR series and marketed commercially under the designation of SIMET AP, and having an average diameter equal to 0.15 mm.

In all of the examples, the liquid phase introduced consisted of 86 kg metasilicate per 100 kg water.

The conditions of treatment are reported in Table 1 and the results attained with the finished product are reported in Table 2, both presented hereafter:

TABLE 1

| Example | Flow Rate of Liquid Phase, Ton/Hour | Flow Rate Of The Powder, Ton/Hour | Inlet Temperature Of Gas At Line 7 (°C.) | Outlet Temperature Of Gas At Line 8 (°C.) | Recycling With Respect To Finished Product | Average Temperature (°C.) | Retention Time In Drum 2 Minutes |
|---|---|---|---|---|---|---|---|
| 1 | 1.880 | 1.9 | 400 | 110 | 25/75 | 45 | 30 |
| 2 | 1.880 | 1.9 | 400 | 95 | 25/75 | 45 | 30 |

TABLE 1-continued

| Example | Flow Rate of Liquid Phase, Ton/Hour | Flow Rate Of The Powder, Ton/Hour | Inlet Temperature Of Gas At Line 7 (°C.) | Outlet Temperature Of Gas At Line 8 (°C.) | Recycling With Respect To Finished Product | Average Temperature (°C.) | Retention Time In Drum 2 Minutes |
| --- | --- | --- | --- | --- | --- | --- | --- |
| 3 | 1.61 | 1.620 | 370 | 90 | 35/65 | 50 | 30 |
| 4 | 1.5 | 1.23 | 330 | 60 | 40/60 | 45 | 30 |
| 5(1) | 1.5 | 1.23 | 330 | 60 | 40/60 | | 0 |
| 6 | 1.88 | 3.1 | 400 | 110 | 15/80 | 45 | 30 |
| 7(2) | 1.88 | 1.9 | 400 | 110 | 25/75 | 45 | 30 |

(1)In the Example 5, there was no drum 2.
(2)This example was identical with the Example 1, except that the metasilicate was treated in drum 2 with a 40% by weight solution of 25 g/100 g of water of monosodium phosphate solution.

TABLE 2

| Example | Water Content % By Weight | | Attrition Resistance In % | Point Of Turbidity (°C.) | Dusting, (% Fines) | Lumping, % Non-Lumpy | Granulometry, $d_{50}$ | Granulometry, $d_{10}$–$d_{90}$ |
| --- | --- | --- | --- | --- | --- | --- | --- | --- |
| | Total | Pentahydrate | | | | | | |
| 1 | 2 | 1 | 9 | 35.1°–39.3° | 1.4 | 50 | 0.67 | 0.40–0.92 |
| 2 | 3 | 2 | 8.5 | 34.7°–37.1° | 1.1 | 65 | 0.80 | 0.47–1.10 |
| 3 | 4 | 3 | 7 | 34.1°–35.5° | 0.8 | 80 | 0.58 | 0.41–0.87 |
| 4 | 5 | 3.1 | 5 | 33.2°–34.2° | 0.4 | 85 | 0.60 | 0.45–0.92 |
| 5 | 5.5 | 0.8 | 10 | 33.8°–35.8° | 1.5 | 70 | 0.73 | 0.40–0.95 |
| 6 | 2 | 1 | 12 | 35.4°–38.5° | 1.8 | 45 | 0.42 | 0.23–0.56 |
| 7 | 4.5 | 4* | 7 | 33.6°–34.1° | 0.7 | 90 | 0.62 | 0.48–0.93 |

*In the form of various hydrated, crystalline salts.

The water content was determined by measuring heat loss at 600° C. and by differential thermal analysis of the pentahydrate.

Resistance to attrition is expressed per that test hereinabove, described, in percentage by weight with respect to initial weight.

The point of turbidity corresponded to that temperature at which turbidity appears in a 1% solution of a mixture of 5 parts by weight of metasilicate per 4 parts by weight of a certain non-ionic compound, the same being a nonylphenol ethoxylated with 9 moles of ethylene oxide moles per mole of nonylphenol and marketed commercially by Rhone-Poulenc under the designation of Cemulsol NP9.

The "dusting" test consisted of measuring the amount of dust or fines electrostatically retained on the walls of a PVC flask subjected to vibration while the product is poured into the flask, and then by titrating the dust solution with 10 N HCl for a sample weight of 50 g, the results being expressed in cm$^3$ of the acid solution.

Finally, the resistance to lumping test consisted of determining the percentage of non-lumpy product after maintaining the product for 24 hours in an atmosphere having a relative humidity of 75% at 40° C., and then for 6 hours at a relative humidity of 20% at 40° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the granulation of sodium metasilicate, comprising (i) establishing, in a first zone, a cloud of anhydrous sodium metasilicate powder; (ii) injecting into said cloud (i), and intimately contacting therewith, an atomized liquid phase which comprises a liquid formulation of a sodium silicate; (iii) said intimate contacting (ii) being conducted in an atmosphere of a drying gas heated to a drying but non-flashing temperature of between about 200° C. and 500° C., whereby crystallization of the anhydrous metasilicate and agglomeration of the thus coated particulates are effected; (iv) next subjecting the effluent cohered granules of said first zone to a state of agitation in a second discrete zone, in an atmosphere of a heating gas having an average temperature of from greater than 42° C. to less than 72° C., which is less than the temperature of the drying gas in said first zone and less than the crystallization temperature of sodium metasilicate pentahydrate and whereby the agitated granules are at least partially converted to the sodium metasilicate pentahydrate; (v) and thence recovering from said second discrete zone a granular sodium metasilicate comprising from about 2 to 6% by weight water with from about 55–80% by weight of this water being in the form of sodium metasilicate pentahydrate.

2. The process as defined in claim 1, wherein the average temperature of the heating gas is no greater than about 65° C.

3. The process as defined by claim 2, wherein the temperature of the drying gas at the outlet of said first zone is between about 50° and 130° C.

4. The process as defined in claim 3, wherein the drying gas is essentially free of carbon dioxide.

5. The process as defined by claim 3, wherein the heating gas is hot air.

6. The process as defined by claim 1, wherein the retention time in the second zone is between about 5 and 30 minutes.

7. The process as defined by claim 1, wherein the liquid formulation of a sodium silicate defining the atomized liquid phase is comprised of anhydrous sodium metasilicate dissolved in water.

8. The process as defined by claim 1, wherein the liquid formulation of a sodium silicate defining the atomized liquid phase is comprised of a sodium silicate treated with sodium hydroxide.

9. The process as defined by claims 1, 3 or 2, wherein the granules cohered in said first zone have a water content of between about 1 and 8% by weight.

10. The process as defined by claim 1, wherein said liquid formulation displays a weight ratio of formulated silicate to anhydrous, ungranulated powder of at least 20/100.

11. The process as defined by claim 1, further comprising recycling a portion of the granular metasilicate recovered in the step (v) as feed to the said first zone.

12. The process as defined by claim 11, wherein the amount of product recycled per amount of final product recovered, by weight, ranges between 20 and 80.

13. The process as defined by claim 12, the recycle ratio being on the order of 40/60.

14. The process as defined by claim 1, wherein the temperature of the drying gas at the outlet of said first zone is between about 50° and 70° C., and the recovered granular sodium metasilicate comprises from about 3 to 6% by weight of water.

15. The process as defined by claim 1, wherein the said cohered granules are concomitantly treated in said second zone with an additive selected from the group comprising citric acid, a phosphorus compound and a gluconic compound.

16. The process as defined by claim 1, wherein the said cloud of metasilicate powder is established essentially entirely in the upstream end of the said first zone.

17. The process as defined by claim 1, wherein both the said first and said second zones are defined by a rotating granulator drum.

18. The process as defined by claim 1, wherein the drying gas is charged concurrently through said first zone, and said heating gas is charged countercurrently through said second zone.

19. The process as defined by claim 1, wherein the anhydrous powder feed to the said first zone has an average particle diameter on the order of 0.15 mm.

20. The product of the process as defined by claims 1, 11 or 15.

* * * * *